United States Patent
Fedor et al.

(10) Patent No.: US 12,379,483 B2
(45) Date of Patent: Aug. 5, 2025

(54) AGRICULTURAL VEHICLE WITH FUSED SENSOR VISION

(71) Applicant: CNH Industrial America LLC, New Holland, PA (US)

(72) Inventors: Christopher Fedor, Apollo, PA (US); Murali Rajakumar, Downer Grove, IL (US)

(73) Assignee: CNH Industrial America LLC, New Holland, PA (US)

( * ) Notice: Subject to any disclaimer, the term of this patent is extended or adjusted under 35 U.S.C. 154(b) by 333 days.

(21) Appl. No.: 18/071,409

(22) Filed: Nov. 29, 2022

(65) Prior Publication Data

US 2024/0176010 A1 May 30, 2024

(51) Int. Cl.
*G01S 13/86* (2006.01)
*A01B 69/00* (2006.01)
*G01S 13/89* (2006.01)
*G01S 13/931* (2020.01)

(52) U.S. Cl.
CPC .......... *G01S 13/867* (2013.01); *A01B 69/001* (2013.01); *G01S 13/89* (2013.01); *G01S 13/931* (2013.01)

(58) Field of Classification Search
CPC .................................................. A01B 69/001
See application file for complete search history.

(56) References Cited

U.S. PATENT DOCUMENTS

| | | | |
|---|---|---|---|
| 9,213,905 B2 | 12/2015 | Lange et al. | |
| 10,091,932 B2 | 10/2018 | Neitemeier et al. | |
| 10,255,670 B1 | 4/2019 | Wu et al. | |
| 10,909,662 B1 | 2/2021 | Chartrand et al. | |
| 2016/0001701 A1* | 1/2016 | Pagliani | G01S 13/931 |
| | | | 701/301 |
| 2018/0128933 A1 | 5/2018 | Koch et al. | |
| 2019/0110389 A1 | 4/2019 | Kirk et al. | |
| 2019/0129036 A1 | 5/2019 | Valouch et al. | |
| 2019/0172964 A1 | 6/2019 | Hermes et al. | |
| 2020/0158856 A1* | 5/2020 | Becker | G01S 13/867 |

* cited by examiner

*Primary Examiner* — Jacob M Amick
(74) *Attorney, Agent, or Firm* — Foley & Lardner LLP (57) ABSTRACT

An agricultural vehicle includes a vision system. The vision system includes multiple cameras, a radar transceiver, and a controller. The multiple cameras are configured to produce image data of an area proximate the agricultural vehicle. The radar transceiver is configured to produce radar data of the area proximate the agricultural vehicle. The controller is configured to obtain the image data and the radar data, and combine the image data and the radar data to produce combined image and radar data. The combined image and radar data accounts for dust clouds in the area proximate the agricultural vehicle. The controller is also configured to present the combined image and radar data to an operator of the agricultural vehicle.

20 Claims, 6 Drawing Sheets

AGRICULTURAL VEHICLE WITH FUSED SENSOR VISION

BACKGROUND

The present disclosure relates generally to an agricultural vehicle. More specifically, the present disclosure relates to a vision system for an agricultural vehicle.

SUMMARY

One embodiment relates to an agricultural vehicle including a vision system. The vision system includes multiple cameras, a radar transceiver, and a controller. The multiple cameras are configured to produce image data of an area proximate the agricultural vehicle. The radar transceiver is configured to produce radar data of the area proximate the agricultural vehicle. The controller is configured to obtain the image data and the radar data, and combine the image data and the radar data to produce combined image and radar data. The combined image and radar data accounts for dust clouds in the area proximate the agricultural vehicle. The controller is also configured to present the combined image and radar data to an operator of the agricultural vehicle.

In some embodiments, the cameras and the radar transceiver are positioned along a top portion of a cab of the agricultural vehicle. In some embodiments, combining the image data and the radar data includes obtaining multiple sets of image data from the cameras, performing a reconstruction technique using the multiple sets of image data to generate a 3-dimensional model of the area proximate the agricultural vehicle, and updating or adjusting the 3-dimensional model of the area using the radar data to account for objects in the area proximate the agricultural vehicle that are obstructed by dust or particulate matter in the area proximate the agricultural vehicle.

In some embodiments, combining the image data and the radar data includes generating a visual representation of the radar data and objects indicated by the radar data that are obstructed by particulate matter or dust. In some embodiments, combining the image data and the radar data further includes overlaying the visual representation of the radar data onto the image data to provide both the image data and the visual representation of the radar data for viewing the area proximate the agricultural vehicle while accounting for dust or particulate matter that obstructs the image data.

In some embodiments, the visual representation is a wire model of an object detected by the radar transceiver. In some embodiments, the radar transceiver is a 3-dimensional radar transmitter and receiver that is configured to emit radio waves and receive returning radio waves to produce 3-dimensional radar data.

In some embodiments, the controller is further configured to provide the combined image and radar data to an obstacle detection system that is configured to detect an obstacle in a path of the agricultural vehicle using the combined image and radar data. In some embodiments, the controller is further configured to provide the combined image and radar data to an object identification system that is configured to identify a type of object in the combined image and radar data. In some embodiments, the controller is further configured to provide the combined image and radar data to a collision avoidance system configured to use the combined image and radar data to alert the operator of the agricultural vehicle regarding an obstacle in the path of the agricultural vehicle and adjust a driveline operation of the agricultural vehicle to avoid the obstacle. In some embodiments, the controller is further configured to provide the combined image and radar data to a safety monitoring system configured to use the combined image and radar data to aggregate safety data regarding different geographic locations of a field.

Another embodiment relates to a vision system for an agricultural vehicle. The vision system includes multiple cameras, a radar transceiver, and processing circuitry. The cameras are configured to produce image data of an area proximate the agricultural vehicle. The radar transceiver is configured to produce radar data of the area proximate the agricultural vehicle. The processing circuitry is configured to obtain the image data and the radar data, combine the image data and the radar data to produce combined image and radar data, and present the combined image and radar data to an operator of the agricultural vehicle. The combined image and radar data accounts for dust clouds in the area proximate the agricultural vehicle.

In some embodiments, combining the image data and the radar data includes obtaining a multiple sets of image data from the cameras. In some embodiments, combining the image data and the radar data includes performing a reconstruction technique using the plurality of sets of image data to generate a 3-dimensional model of the area proximate the agricultural vehicle, and updating or adjusting the 3-dimensional model of the area using the radar data to account for objects in the area proximate the agricultural vehicle that are obstructed by dust or particulate matter in the area proximate the agricultural vehicle.

In some embodiments, combining the image data and the radar data includes generating a visual representation of the radar data and objects indicated by the radar data that are obstructed by dust or particulate matter. In some embodiments, combining the image data and the radar data also includes overlaying the visual representation of the radar data onto the image data to provide both the image data and the visual representation of the radar data for viewing the area proximate the agricultural vehicle while accounting for dust or particulate matter that obstructs the image data.

In some embodiments, the visual representation is a wire model of an object detected by the radar transceiver. In some embodiments, the radar transceiver is a 3-dimensional radar transmitter and receiver that is configured to emit radio waves and receive returning radio waves to produce 3-dimensional radar data.

In some embodiments, the controller is further configured to provide the combined image and radar data to an obstacle detection system configured to detect an obstacle in a path of the agricultural vehicle using the combined image and radar data. In some embodiments, the controller is further configured to provide the combined image and radar data to an object identification system configured to identify a type of object in the combined image and radar data. In some embodiments, the controller is further configured to provide the combined image and radar data to a collision avoidance system configured to use the combined image and radar data to alert the operator of the agricultural vehicle regarding an obstacle in the path of the agricultural vehicle and adjust a driveline operation of the agricultural vehicle to avoid the obstacle. In some embodiments, the controller is further configured to provide the combined image and radar data to a safety monitoring system configured to use the combined image and radar data to aggregate safety data regarding different geographic locations of a field.

Still another embodiment relates to a method for detecting objects in an environment of an agricultural vehicle. The method includes obtaining image data from multiple cameras configured to capture image data of visible light, and obtaining radar data from a radar transmitter and receiver. The method also includes combining the image data with the radar data to produce combined image and radar data that accounts for dust clouds or particulate matter in an area proximate the agricultural vehicle that obstruct representation of an object by the image data, the object represented by the radar data. The method also includes operating a display screen to display the combined image and radar data to an operator of the agricultural vehicle so that the operator can view a visual representation of the object obstructed by the dust clouds or the particulate matter.

In some embodiments, combining the image data and the radar data includes obtaining a multiple sets of image data from the cameras and performing a reconstruction technique using the sets of image data to generate a 3-dimensional model of the area proximate the agricultural vehicle. In some embodiments, combining the image data and the radar data also includes updating or adjusting the 3-dimensional model of the area using the radar data to account for the object in the area proximate the agricultural vehicle that are obstructed by the dust clouds or particulate matter in the area proximate the agricultural vehicle.

In some embodiments, combining the image data and the radar data includes generating a visual representation of the radar data and the object indicated by the radar data that is obstructed by the dust clouds or the particulate matter. In some embodiments, combining the image data and the radar data also includes overlaying the visual representation of the radar data onto the image data to provide both the image data and the visual representation of the radar data for viewing the area proximate the agricultural vehicle while accounting for dust or particulate matter that obstructs the image data.

In some embodiments, the visual representation is a wire model of an object detected by the radar transceiver. In some embodiments, the radar transmitter and receiver is a 3-dimensional radar transmitter and receiver that is configured to emit radio waves and receive returning radio waves to produce 3-dimensional radar data.

In some embodiments, the method further includes providing the combined image and radar data to an obstacle detection system configured to detect an obstacle in a path of the agricultural vehicle using the combined image and radar data. In some embodiments, the method further includes providing the combined image and radar data to an object identification system configured to identify a type of object in the combined image and radar data. In some embodiments, the method further includes providing the combined image and radar data to a collision avoidance system configured to use the combined image and radar data to alert the operator of the agricultural vehicle regarding an obstacle in the path of the agricultural vehicle and adjust a driveline operation of the agricultural vehicle to avoid the obstacle. In some embodiments, the method further includes providing the combined image and radar data to a safety monitoring system configured to use the combined image and radar data to aggregate safety data regarding different geographic locations of a field. In some embodiments, the method further includes adjusting a driveline operation of the agricultural vehicle to adjust speed or steering of the agricultural vehicle responsive to the combined image and radar data.

This summary is illustrative only and is not intended to be in any way limiting. Other aspects, inventive features, and advantages of the devices or processes described herein will become apparent in the detailed description set forth herein, taken in conjunction with the accompanying figures, wherein like reference numerals refer to like elements.

DETAILED DESCRIPTION

Before turning to the figures, which illustrate certain exemplary embodiments in detail, it should be understood that the present disclosure is not limited to the details or methodology set forth in the description or illustrated in the figures. It should also be understood that the terminology used herein is for the purpose of description only and should not be regarded as limiting.

According to an exemplary embodiment, an agricultural vehicle of the present disclosure includes a vision system that uses both image data (e.g., visible light image data) and radar data. The image data can advantageously be presented to an operator of the vehicle to provide improved vision for the operator. However, dust clouds or particulate matter, particularly in the context of an agricultural machine, may cause obstructed view of objects when using visible light. Advantageously, the vision system uses the radar data and fuses or combines the radar data with the image data so that the operator can see through the dust or particulate matter in an unobstructed manner.

Overall Vehicle

Figure 1:
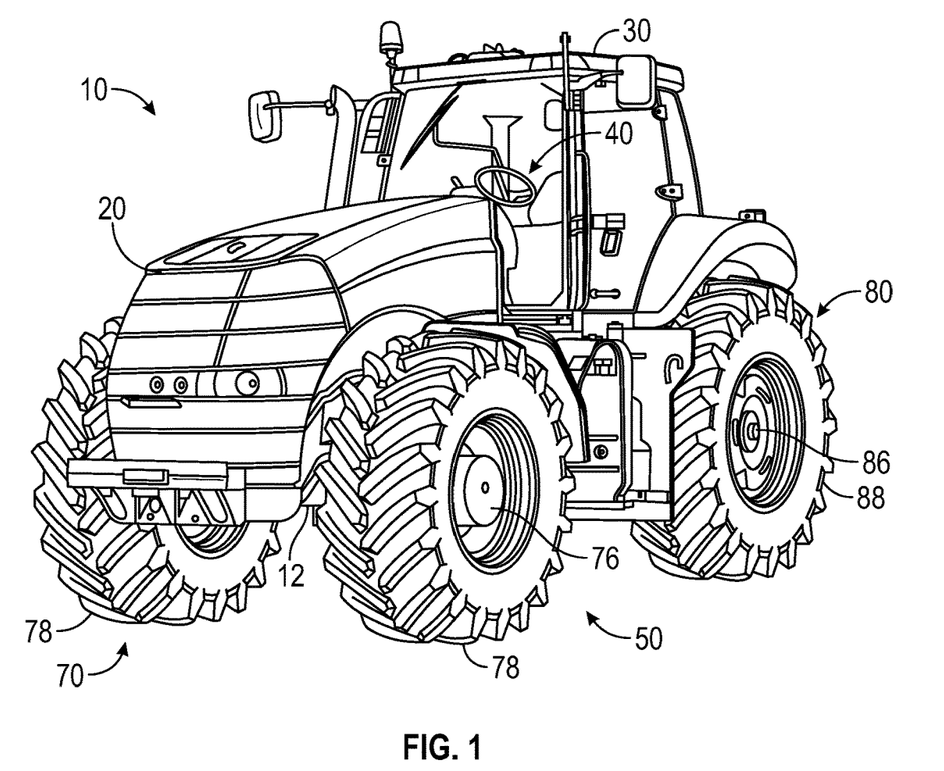
FIG. 1 is a perspective view of a vehicle, according to an exemplary embodiment.
Figure 2:
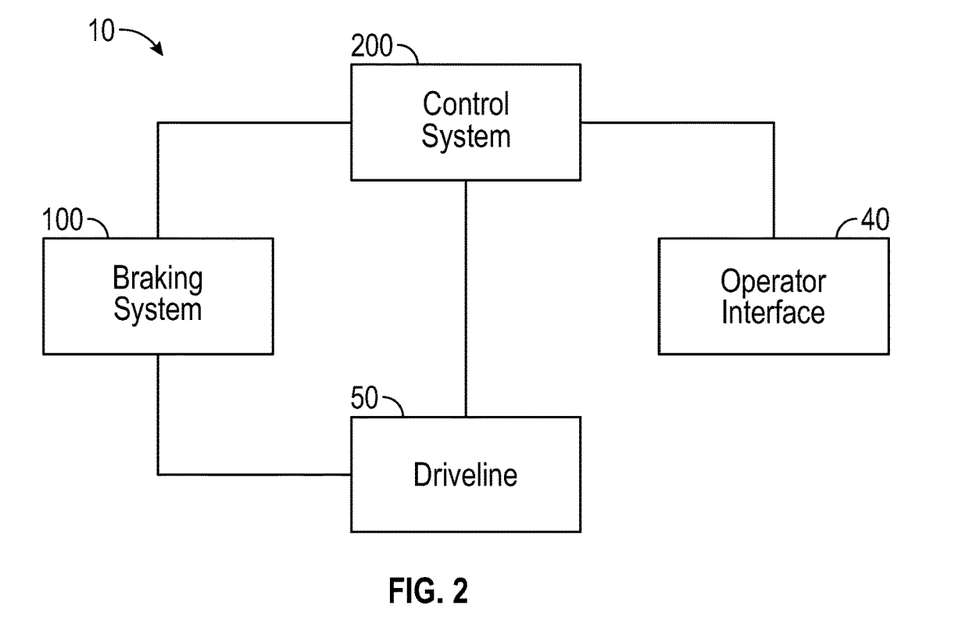
FIG. 2 is a schematic block diagram of the vehicle of FIG. 1, according to an exemplary embodiment.
Figure 3:
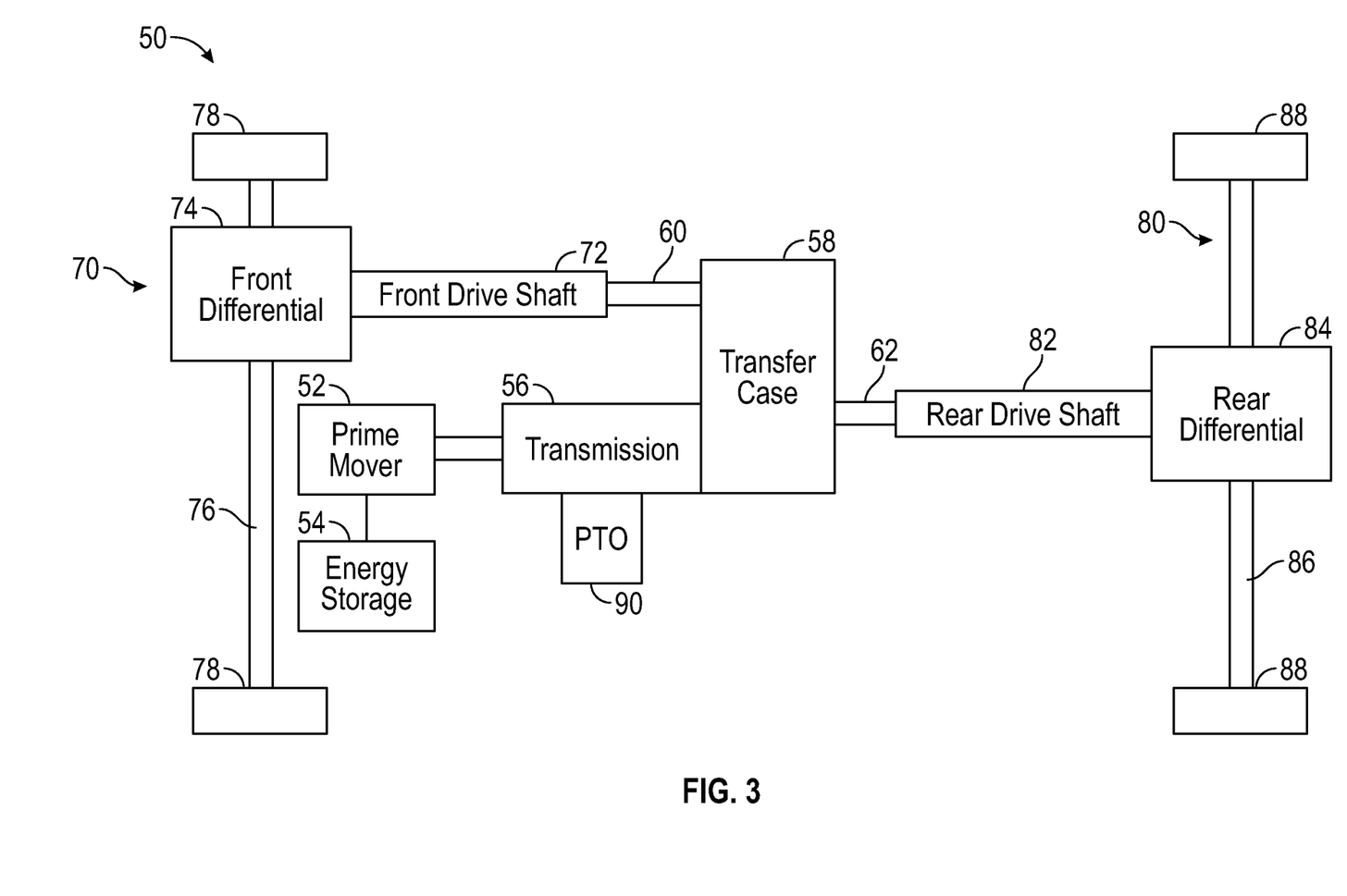
FIG. 3 is a schematic block diagram of a driveline of the vehicle of FIG. 1, according to an exemplary embodiment.

According to the exemplary embodiment shown in FIGS. 1-3, a machine or vehicle, shown as vehicle 10, includes a chassis, shown as frame 12; a body assembly, shown as body 20, coupled to the frame 12 and having an occupant portion or section, shown as cab 30; operator input and output devices, shown as operator interface 40, that are disposed within the cab 30; a drivetrain, shown as driveline 50, coupled to the frame 12 and at least partially disposed under the body 20; a vehicle braking system, shown as braking system 100, coupled to one or more components of the driveline 50 to facilitate selectively braking the one or more components of the driveline 50; and a vehicle control system, shown as control system 200, coupled to the operator interface 40, the driveline 50, and the braking system 100. In other embodiments, the vehicle 10 includes more or fewer components.

According to an exemplary embodiment, the vehicle 10 is an off-road machine or vehicle. In some embodiments, the off-road machine or vehicle is an agricultural machine or vehicle such as a tractor, a telehandler, a front loader, a combine harvester, a grape harvester, a forage harvester, a sprayer vehicle, a speedrower, and/or another type of agricultural machine or vehicle. In some embodiments, the off-road machine or vehicle is a construction machine or vehicle such as a skid steer loader, an excavator, a backhoe loader, a wheel loader, a bulldozer, a telehandler, a motor grader, and/or another type of construction machine or vehicle. In some embodiments, the vehicle 10 includes one or more attached implements and/or trailed implements such as a front mounted mower, a rear mounted mower, a trailed mower, a tedder, a rake, a baler, a plough, a cultivator, a rotavator, a tiller, a harvester, and/or another type of attached implement or trailed implement.

According to an exemplary embodiment, the cab 30 is configured to provide seating for an operator (e.g., a driver, etc.) of the vehicle 10. In some embodiments, the cab 30 is configured to provide seating for one or more passengers of the vehicle 10. According to an exemplary embodiment, the operator interface 40 is configured to provide an operator with the ability to control one or more functions of and/or provide commands to the vehicle 10 and the components thereof (e.g., turn on, turn off, drive, turn, brake, engage various operating modes, raise/lower an implement, etc.). The operator interface 40 may include one or more displays and one or more input devices. The one or more displays may be or include a touchscreen, a LCD display, a LED display, a speedometer, gauges, warning lights, etc. The one or more input device may be or include a steering wheel, a joystick, buttons, switches, knobs, levers, an accelerator pedal, a brake pedal, etc.

According to an exemplary embodiment, the driveline 50 is configured to propel the vehicle 10. As shown in FIG. 3, the driveline 50 includes a primary driver, shown as prime mover 52, and an energy storage device, shown as energy storage 54. In some embodiments, the driveline 50 is a conventional driveline whereby the prime mover 52 is an internal combustion engine and the energy storage 54 is a fuel tank. The internal combustion engine may be a spark-ignition internal combustion engine or a compression-ignition internal combustion engine that may use any suitable fuel type (e.g., diesel, ethanol, gasoline, natural gas, propane, etc.). In some embodiments, the driveline 50 is an electric driveline whereby the prime mover 52 is an electric motor and the energy storage 54 is a battery system. In some embodiments, the driveline 50 is a fuel cell electric driveline whereby the prime mover 52 is an electric motor and the energy storage 54 is a fuel cell (e.g., that stores hydrogen, that produces electricity from the hydrogen, etc.). In some embodiments, the driveline 50 is a hybrid driveline whereby (i) the prime mover 52 includes an internal combustion engine and an electric motor/generator and (ii) the energy storage 54 includes a fuel tank and/or a battery system.

As shown in FIG. 3, the driveline 50 includes a transmission device (e.g., a gearbox, a continuous variable transmission ("CVT"), etc.), shown as transmission 56, coupled to the prime mover 52; a power divider, shown as transfer case 58, coupled to the transmission 56; a first tractive assembly, shown as front tractive assembly 70, coupled to a first output of the transfer case 58, shown as front output 60; and a second tractive assembly, shown as rear tractive assembly 80, coupled to a second output of the transfer case 58, shown as rear output 62. According to an exemplary embodiment, the transmission 56 has a variety of configurations (e.g., gear ratios, etc.) and provides different output speeds relative to a mechanical input received thereby from the prime mover 52. In some embodiments (e.g., in electric driveline configurations, in hybrid driveline configurations, etc.), the driveline 50 does not include the transmission 56. In such embodiments, the prime mover 52 may be directly coupled to the transfer case 58. According to an exemplary embodiment, the transfer case 58 is configured to facilitate driving both the front tractive assembly 70 and the rear tractive assembly 80 with the prime mover 52 to facilitate front and rear drive (e.g., an all-wheel-drive vehicle, a four-wheel-drive vehicle, etc.). In some embodiments, the transfer case 58 facilitates selectively engaging rear drive only, front drive only, and both front and rear drive simultaneously. In some embodiments, the transmission 56 and/or the transfer case 58 facilitate selectively disengaging the front tractive assembly 70 and the rear tractive assembly 80 from the prime mover 52 (e.g., to permit free movement of the front tractive assembly 70 and the rear tractive assembly 80 in a neutral mode of operation). In some embodiments, the driveline 50 does not include the transfer case 58. In such embodiments, the prime mover 52 or the transmission 56 may directly drive the front tractive assembly 70 (i.e., a front-wheel-drive vehicle) or the rear tractive assembly 80 (i.e., a rear-wheel-drive vehicle).

As shown in FIGS. 1 and 3, the front tractive assembly 70 includes a first drive shaft, shown as front drive shaft 72, coupled to the front output 60 of the transfer case 58; a first differential, shown as front differential 74, coupled to the front drive shaft 72; a first axle, shown front axle 76, coupled to the front differential 74; and a first pair of tractive elements, shown as front tractive elements 78, coupled to the front axle 76. In some embodiments, the front tractive assembly 70 includes a plurality of front axles 76. In some embodiments, the front tractive assembly 70 does not include the front drive shaft 72 or the front differential 74 (e.g., a rear-wheel-drive vehicle). In some embodiments, the front drive shaft 72 is directly coupled to the transmission 56 (e.g., in a front-wheel-drive vehicle, in embodiments where the driveline 50 does not include the transfer case 58, etc.) or the prime mover 52 (e.g., in a front-wheel-drive vehicle, in embodiments where the driveline 50 does not include the transfer case 58 or the transmission 56, etc.). The front axle 76 may include one or more components.

As shown in FIGS. 1 and 3, the rear tractive assembly 80 includes a second drive shaft, shown as rear drive shaft 82, coupled to the rear output 62 of the transfer case 58; a second differential, shown as rear differential 84, coupled to the rear drive shaft 82; a second axle, shown rear axle 86, coupled to the rear differential 84; and a second pair of tractive elements, shown as rear tractive elements 88, coupled to the rear axle 86. In some embodiments, the rear tractive assembly 80 includes a plurality of rear axles 86. In some embodiments, the rear tractive assembly 80 does not include the rear drive shaft 82 or the rear differential 84 (e.g., a front-wheel-drive vehicle). In some embodiments, the rear drive shaft 82 is directly coupled to the transmission 56 (e.g., in a rear-wheel-drive vehicle, in embodiments where the driveline 50 does not include the transfer case 58, etc.) or the prime mover 52 (e.g., in a rear-wheel-drive vehicle, in embodiments where the driveline 50 does not include the transfer case 58 or the transmission 56, etc.). The rear axle 86 may include one or more components. According to the exemplary embodiment shown in FIG. 1, the front tractive elements 78 and the rear tractive elements 88 are structured as wheels. In other embodiments, the front tractive elements 78 and the rear tractive elements 88 are otherwise structured (e.g., tracks, etc.). In some embodiments, the front tractive elements 78 and the rear tractive elements 88 are both steerable. In other embodiments, only one of the front tractive elements 78 or the rear tractive elements 88 is steerable. In still other embodiments, both the front tractive elements 78 and the rear tractive elements 88 are fixed and not steerable.

In some embodiments, the driveline 50 includes a plurality of prime movers 52. By way of example, the driveline 50 may include a first prime mover 52 that drives the front tractive assembly 70 and a second prime mover 52 that drives the rear tractive assembly 80. By way of another example, the driveline 50 may include a first prime mover 52 that drives a first one of the front tractive elements 78, a second prime mover 52 that drives a second one of the front tractive elements 78, a third prime mover 52 that drives a first one of the rear tractive elements 88, and/or a fourth prime mover 52 that drives a second one of the rear tractive elements 88. By way of still another example, the driveline 50 may include a first prime mover that drives the front tractive assembly 70, a second prime mover 52 that drives a first one of the rear tractive elements 88, and a third prime mover 52 that drives a second one of the rear tractive elements 88. By way of yet another example, the driveline 50 may include a first prime mover that drives the rear tractive assembly 80, a second prime mover 52 that drives a first one of the front tractive elements 78, and a third prime mover 52 that drives a second one of the front tractive elements 78. In such embodiments, the driveline 50 may not include the transmission 56 or the transfer case 58.

As shown in FIG. 3, the driveline 50 includes a power-take-off ("PTO"), shown as PTO 90. While the PTO 90 is shown as being an output of the transmission 56, in other embodiments the PTO 90 may be an output of the prime mover 52, the transmission 56, and/or the transfer case 58. According to an exemplary embodiment, the PTO 90 is configured to facilitate driving an attached implement and/or a trailed implement of the vehicle 10. In some embodiments, the driveline 50 includes a PTO clutch positioned to selectively decouple the driveline 50 from the attached implement and/or the trailed implement of the vehicle 10 (e.g., so that the attached implement and/or the trailed implement is only operated when desired, etc.).

According to an exemplary embodiment, the braking system 100 includes one or more brakes (e.g., disc brakes, drum brakes, in-board brakes, axle brakes, etc.) positioned to facilitate selectively braking (i) one or more components of the driveline 50 and/or (ii) one or more components of a trailed implement. In some embodiments, the one or more brakes include (i) one or more front brakes positioned to facilitate braking one or more components of the front tractive assembly 70 and (ii) one or more rear brakes positioned to facilitate braking one or more components of the rear tractive assembly 80. In some embodiments, the one or more brakes include only the one or more front brakes. In some embodiments, the one or more brakes include only the one or more rear brakes. In some embodiments, the one or more front brakes include two front brakes, one positioned to facilitate braking each of the front tractive elements 78. In some embodiments, the one or more front brakes include at least one front brake positioned to facilitate braking the front axle 76. In some embodiments, the one or more rear brakes include two rear brakes, one positioned to facilitate braking each of the rear tractive elements 88. In some embodiments, the one or more rear brakes include at least one rear brake positioned to facilitate braking the rear axle 86. Accordingly, the braking system 100 may include one or more brakes to facilitate braking the front axle 76, the front tractive elements 78, the rear axle 86, and/or the rear tractive elements 88. In some embodiments, the one or more brakes additionally include one or more trailer brakes of a trailed implement attached to the vehicle 10. The trailer brakes are positioned to facilitate selectively braking one or more axles and/or one or more tractive elements (e.g., wheels, etc.) of the trailed implement.

Sensor Fusion

Figure 4:
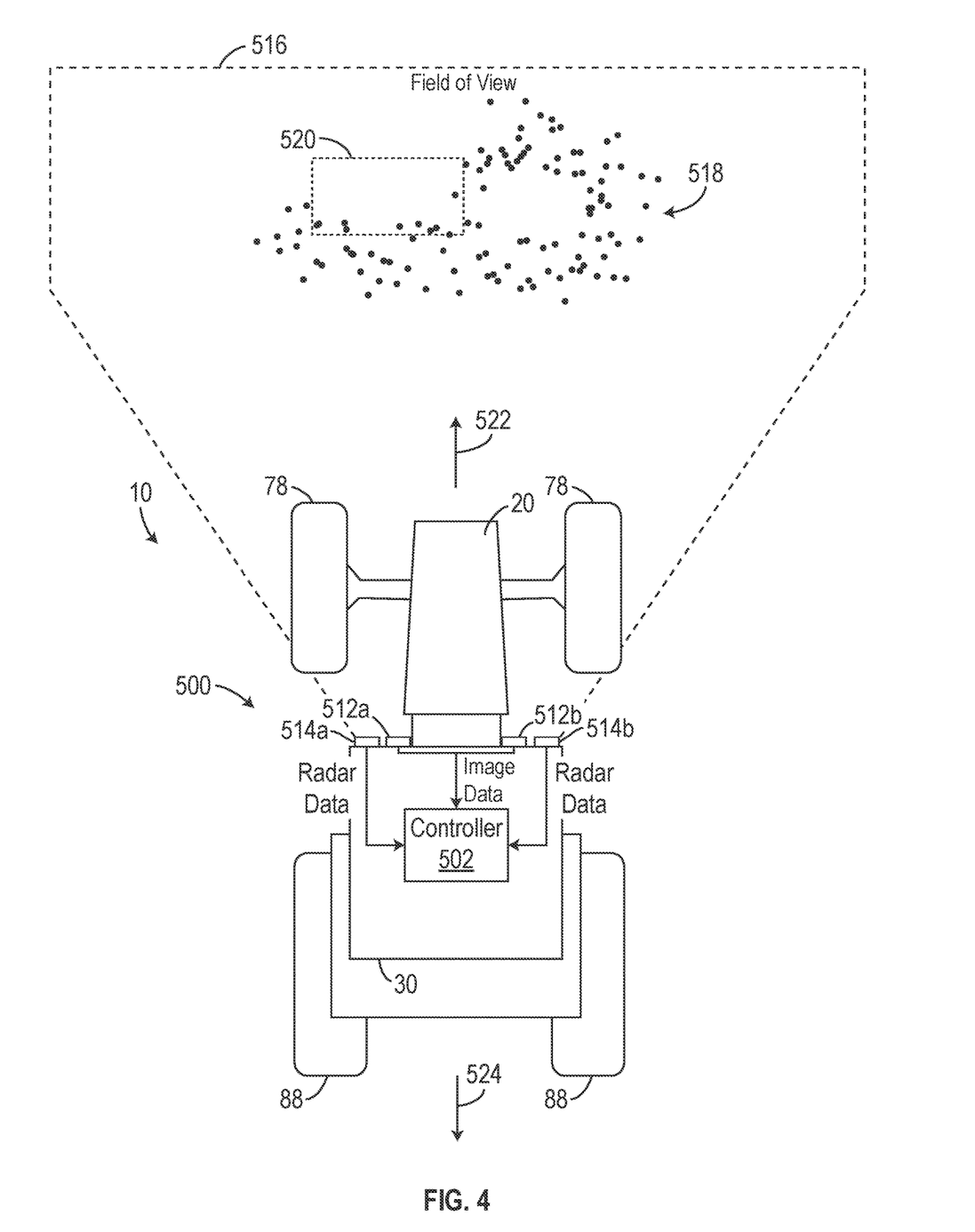
FIG. 4 is a diagram illustrating the vehicle of FIG. 1 equipped with an imaging system, according to an exemplary embodiment.
Figure 5:
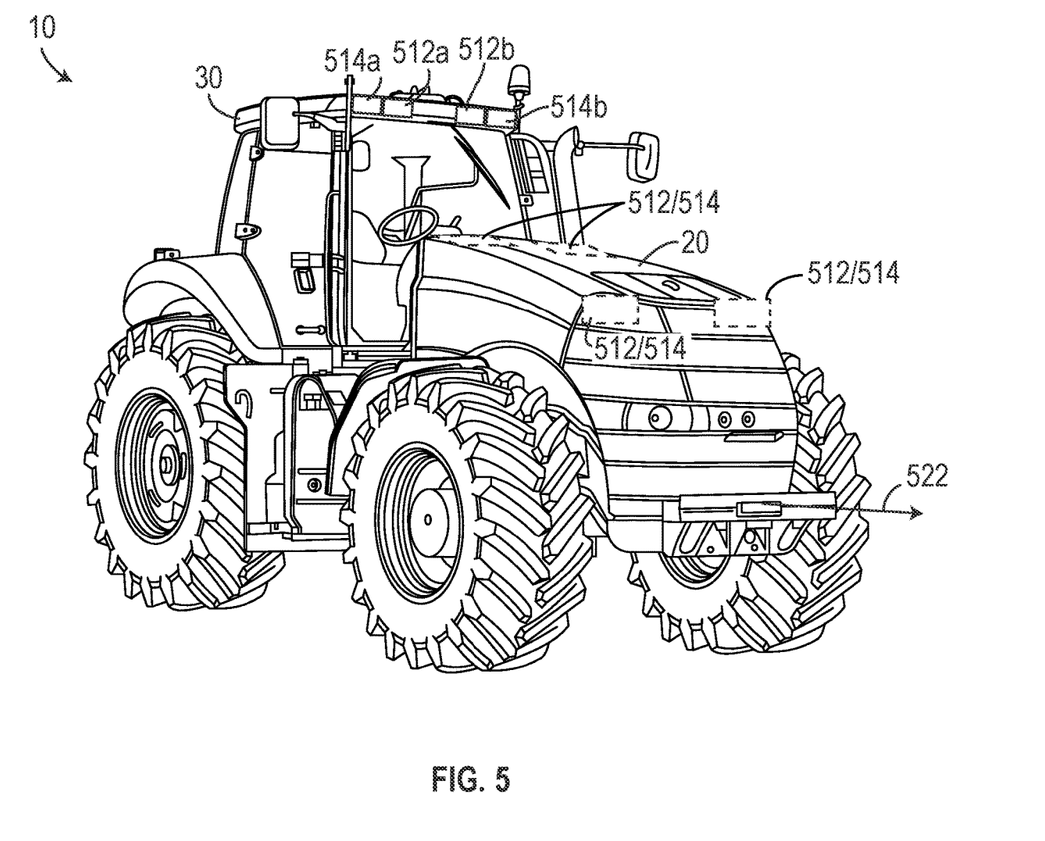
FIG. 5 is a perspective view of the vehicle of FIG. 4, according to an exemplary embodiment.

Referring to FIGS. 4-5, the vehicle 10 can be equipped with an imaging system 500 (e.g., a detection system, a radar system, an awareness system, etc.) that is configured to monitor an environment or area surrounding (e.g., in front of, behind, on the sides of, etc.) the vehicle 10 and detect objects within the environment or area surrounding the vehicle 10. In some embodiments, the imaging system 500 is configured to obtain image data and radar data regarding a field of view 516 that is in front of the vehicle 10 as the vehicle 10 translates in a forwards direction 522. In some embodiments, the imaging system 500 is also configured to monitor an area rearwards of the vehicle 10 or on the sides of the vehicle 10 in order to detect objects behind the vehicle 10 when the vehicle 10 transports in a rearwards direction 524 or makes turns.

When the vehicle 10 transports (e.g., during transportation operation or during a field operation), clouds of dust 518 or particulate matter may obstruct a view of an object 520 that is within the field of view 516. Imaging devices that use visible light (e.g., cameras) may have difficulty detecting or obtaining image data of the object 520 (e.g., an obstacle, an animal, a rock, a tree, etc.) due to the clouds of dust 518 (e.g., crop dust, dirt, particulate matter). The imaging system 500 advantageously uses two modes of imaging data (e.g., visible light image data and radar data) in a fused or combined manner to provide a hybrid or updated image of the field of view 516.

Referring still to FIGS. 4-5, the imaging system 500 includes one or more cameras 512a and 512b that are disposed on the vehicle 10 and are oriented such that the cameras 512 obtain image data (e.g., using visible light) of the field of view 516. The imaging system 500 also includes a controller 502 that is configured to obtain the image data from the cameras 512. The imaging system 500 also includes one or more radar transmitters/receivers, shown as radar transceivers 514a and 514b. The radar transceivers 514 are configured to emit radio waves about the field of view 516 in order to detect the object 520. The radar transceivers 514 receive responsive or reflected radio waves and generate data indicative of distance, angle, and radial velocity of the object 520. In some embodiments, the radar transceiver 514 are 3-dimensional (3D) radar transceivers that are configured to determine position and extension of the object 520 in three dimensions or directions. The controller 502 is configured to obtain the radar data from the radar transceivers 514 and use the image data and the radar data to generate imagery of the field of view 516 that uses both image data and the radar data.

Referring particularly to FIG. 5, the cameras 512 and the radar transceivers 514 can be positioned on the cab 30 (e.g., along a top portion of bar on a front of the cab 30) such that the cameras 512 and the radar transceivers 514 are configured to obtain image data and radar data of the field of view 516 in front of the vehicle 10 without being obstructed by portions of the vehicle 10 or implements of the vehicle 10. In some embodiments, the cameras 512 and the radar transceivers 514 are positioned on an upper portion of the body 20 of the vehicle 10. In some embodiments, the cameras 512 and the radar transceivers 514 are positioned on a front portion of the body 20 of the vehicle 10. In some embodiments, the cameras 512 and the radar transceivers 514 are positioned on the implement or positioned on or proximate mirrors of the vehicle 10.

Referring particularly to FIG. 5, the controller 502 includes a circuit, shown as processing circuitry 504, a processor, shown as processor 506, and memory, shown as memory 510, according to an exemplary embodiment. Controller 502 may be implemented as a general-purpose processor, an application specific integrated circuit (ASIC), one or more field programmable gate arrays (FPGAs), a digital-signal-processor (DSP), circuits containing one or more processing components, circuitry for supporting a microprocessor, a group of processing components, or other suitable electronic processing components. According to the exemplary embodiment shown in FIG. 5, controller 502 includes the processing circuitry 504 and memory 510. Processing circuitry 504 may include an ASIC, one or more FPGAs, a DSP, circuits containing one or more processing components, circuitry for supporting a microprocessor, a group of processing components, or other suitable electronic processing components (e.g., processor 305). In some embodiments, processing circuitry 504 is configured to execute computer code stored in memory 510 to facilitate the activities described herein. Memory 510 may be any volatile or non-volatile computer-readable storage medium capable of storing data or computer code relating to the activities described herein. According to an exemplary embodiment, memory 510 includes computer code modules (e.g., executable code, object code, source code, script code, machine code, etc.) configured for execution by processing circuitry 504. In some embodiments, controller 502 may represent a collection of processing devices (e.g., servers, data centers, etc.). In such cases, processing circuitry 504 represents the collective processors of the devices, and memory 510 represents the collective storage devices of the devices.

Figure 6:
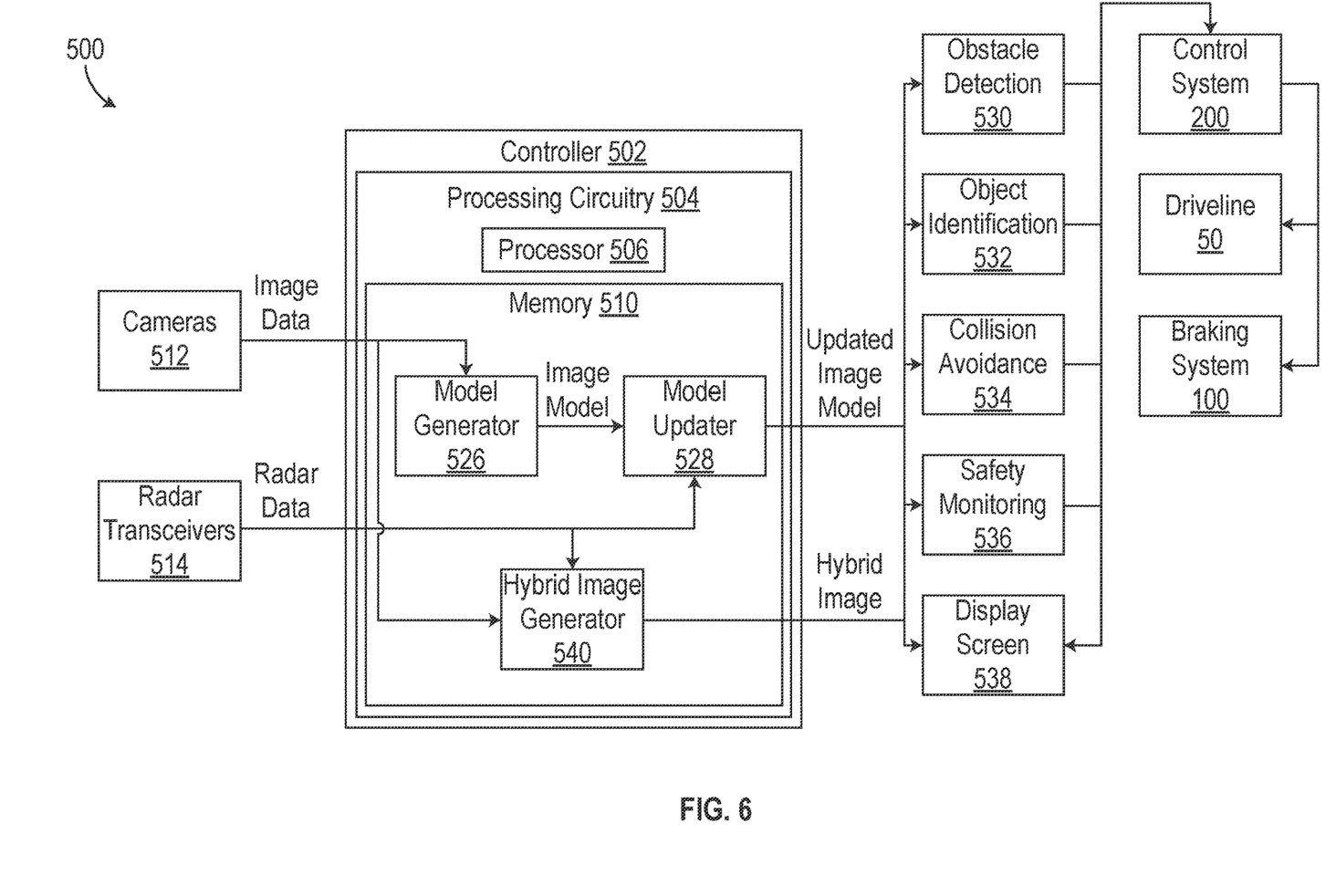
FIG. 6 is a block diagram of a block diagram of the imaging system of FIGS. 4-5, according to an exemplary embodiment.

The controller 502 is configured to obtain the image data from the cameras 512 and the radar data from the radar transceivers 514. The image data may indicate visual or visible light data of the field of view 516 of the vehicle 10. The radar data may indicate multiple points or clusters of point data that indicates one or more objects in the field of view 516 or the area surrounding the vehicle 10. The controller 502 may receive the image data and the radar data from a communications line, a wireless communications link, a controller area network (CAN) bus of the vehicle 10, etc. In some embodiments, the memory 510 includes a model generator 526 and a model updater 528. The memory 510 may alternatively or additionally include a hybrid image generator 540.

The model generator 526 may obtain the image data from the cameras 512 and perform an image analysis or generation technique in order to generate an image model of the field of view 516 of the vehicle 10. In some embodiments, the model generator 526 is configured to use the image data from multiple of the cameras 512 in order to generate a three-dimensional visual model (e.g., a CAD model) of the environment of the vehicle 10. In some embodiments, the image model is a graphical representation of objects or environment of the vehicle 10 that can be accurately distinguished using the image data. The model generator 526 may use machine learning or artificial intelligence (e.g., a generative adversarial network) and can use corresponding images from different perspectives in order to determine depth of the environment of the vehicle 10 (e.g., in the field of view 516). In some embodiments, the model generator 526 is configured to perform a reconstruction technique or process to generate 3D model data of the environment or area surrounding the vehicle 10 based on multiple 2-dimensional (2D) images obtained by the cameras 512. In some embodiments, the cameras 512 include an array of cameras or one or more cameras 512 having wide angle lenses so that reconstruction can be performed using the image data by the model generator 526. In some embodiments, the model generator 526 is configured to perform a projective reconstruction technique without any a priori information. The model generator 526 may perform a stratification technique to generate 3D Euclidean geometry of the environment or area surrounding the vehicle 10. In some embodiments, the model generator 526 also uses known orientations and angles of the cameras 512 corresponding to different views. The model generator 526 may also perform a surface rendering technique with texturing using the image data in order to generate the image model. In some embodiments, the model generator 512 also performs a filtering technique in order to mitigate or reduce dust or particulate matter presence in the image data. In some embodiments, the radar data is used to validate the results of the model generator 512.

The model generator 526 is configured to provide the image model to the model updater 528. The model updater 528 receives the radar data from the radar transceivers 514 and uses the radar data to calibrate, update, adjust, check an accuracy of, etc., the image model. The radar data may be 3D data and may include one or more 3D points in a virtual 3D space (e.g., corresponding to the object 520 or the objects in the area surrounding the vehicle 10). The radar data can therefore indicate or include data regarding objects that are obstructed by dust clouds 518 or particulate matter in an agricultural environment (e.g., "see-through" the dust). The model updater 528 may use the radar data to verify, calibrate, update, or adjust the image model. For example, if the radar data indicates that there are no objects in the field of view 516 and the image data from the cameras 512 also indicates that there are no objects in the field of view 516, the model updater 528 may verify that the image model is accurate and does not require update. However, if the image model misses does not include an object (e.g., object 520) within the field of view 516 of the vehicle 10 due to the dust clouds 518, and the radar data indicates that an object is present behind or within the dust cloud 518, the model updater 528 adjusts or updates the image model using the radar data of the object 520 behind the dust cloud 518 by performing a surface rendering technique to generate the object 520 based on the radar data and insert the surface rendering into the image model so that the image model includes the object 520 positioned behind the dust cloud 518. In some embodiments, the model updater 528 is configured to update the image model in real-time in order to reflect changes to position or speed of the objects (e.g., animals) detected by the radar transceivers 514. In this way, the model updater 528 updates the model (e.g., a 3D or a 2D image) produced by the model generator 526 so that the updated model is free from dust or dirt (e.g., to filter out the dust clouds 518) so that the vehicle 10 or the operator of the vehicle 10 can "see-through" the dust clouds 518.

In some embodiments, the hybrid image generator 540 is configured to obtain both the image data and the radar data and blend or combine (e.g., overlay) the radar data with the image data to provide a hybrid image. In some embodiments, the hybrid image generator 540 is configured to obtain the image data from the cameras 512, and insert or overlay a visual representation of the radar data (e.g., 3D radar data) onto the image data to generate the hybrid image. The radar data can be visually represented by phantom lines, wire models, highlighted lines, a glowing object, dashed lines, red lines, brightly colored geometrical shapes, etc. Advantageously, the hybrid image includes both the image data as obtained from the cameras 512 as well as the radar data, rendered over the image data in a manner to increase perceptibility or visibility of the object The model updater 528 is configured to provide the updated image model to an obstacle detection system 530, an object identification system 532, a collision avoidance system 534, a safety monitoring system 536, and/or a display screen 538 (e.g., a display screen of the operator interface 40). The hybrid image generator 540 is also configured to provide the hybrid image to any of the obstacle detection system 530, the object identification system 532, the collision avoidance system 534, the safety monitoring system 536, and/or the display screen 538. In some embodiments, the functionality of the obstacle detection system 530, the object identification system 532, the collision avoidance system 534, and/or the safety monitoring system 536 are performed by the controller 502 or by other similar controllers or processing circuitry of the vehicle 10. In some embodiments, the obstacle detection system 530, the object identification system 532, the collision avoidance system 534, and/or the safety monitoring system 536 are configured to provide their outputs to the display screen 538 and/or to the control system 200 for use in adjusting operation or control of the vehicle 10. In some embodiments, one or more of the obstacle detection system 530, the object identification system 532, the collision avoidance system 534, and/or the safety monitoring system 536 are implemented on a cloud computing system or a server, or one or more processes or functionality thereof are implemented or offloaded to a server.

The display screen 538 can be positioned within the cab 30 of the vehicle 10 and may be a touchscreen, a light emitting diode (LED) screen, a liquid crystal display (LCD) screen, etc. In some embodiments, the display screen 538 includes or is configured to communicate with an augmented reality or virtual reality headset or head wearable device for the operator of the vehicle 10. The display screen 538 is configured to visually and/or immersively present the updated image model or the hybrid image to the operator of the vehicle 10. In some embodiments, the display screen 538 is a remote device (e.g., at a control center) if the vehicle 10 is an autonomous device or is a remotely controlled device. In some embodiments, the display screen 538 is a portion of a windshield of the cab 30 of the vehicle 10, and the updated image model, the hybrid image, or portions of the updated image model or the hybrid image that are obstructed from the view of the operator due to dust are superimposed onto the windshield in an augmented reality manner.

The obstacle detection system 530 can use the updated image model and/or the hybrid image model to perform an object detection and determine if an object is within a path of the vehicle 10 as the vehicle transports in a field or on a road (e.g., in an agricultural, or a transportation environment, respectively). The obstacle detection system 530 may obtain the updated image model or the hybrid image, and based on a predicted or projected path of the vehicle 10, detect if an object is within the path of the vehicle 10. The obstacle detection system 530 may be configured to operate a visual alert device or an aural alert device in order to notify the operator of the vehicle 10 regarding the detected object.

The object identification system 532 may use a database and an image recognition technique to determine or identify a type of object that is detected (e.g., by the obstacle detection system 530) in the updated image model and/or the hybrid image. In some embodiments, the object identification system 532 is configured to use a database of objects, animals, etc., that may be encountered in an agricultural environment (e.g., trees, rocks, bodies of water, animals, tree stumps, machinery, etc.). The object identification system 532 may use a neural network or machine learning to implement the image recognition technique in order to match the detected objects or obstacles to one of the objects of the database. The identification of the object(s) in the field of view 516 of the vehicle 10 can be provided to the display screen 538, and high priority or avoidance objects may be highlighted, callouts can be added to indicate the type of object identified, etc.

The collision avoidance system 534 is configured to use the updated image model, the hybrid image, and/or the outputs of the obstacle detection system 530 or the object identification system 532 to determine a corrective measure or action to avoid a collision with the object that is detected using the image data and/or the radar data. In some embodiments, the corrective measure or action includes braking, stopping, or slowing the vehicle 10. In some embodiments, the corrective measure or action includes adjusting a path (e.g., steering) of the vehicle 10 to avoid the obstacle. In some embodiments, the corrective measure or action includes honking a horn of the vehicle 10 to prompt an animal to move out of the way of the vehicle 10. The collision avoidance system 534 may provide the corrective measure or action to the control system 200 so that the control system 200 can use the corrective measure or action to operate the driveline 50, the braking system 100, or any other system or sub-system of the vehicle 10 to perform the corrective measure or action.

The safety monitoring system 536 may use results of the obstacle detection system 530 and/or the object identification system 532 as well as geographic locations of the vehicle 10 to learn the locations of specific objects or obstacles (e.g., trees, rocks, etc.) and generate a mapping for safety precautions. In some embodiments, the safety monitoring system 536 aggregates data from the vehicle 10 or other vehicles 10 and can provide the controller 502 with the mapping for future operation of the vehicle 10.

Figure 7:
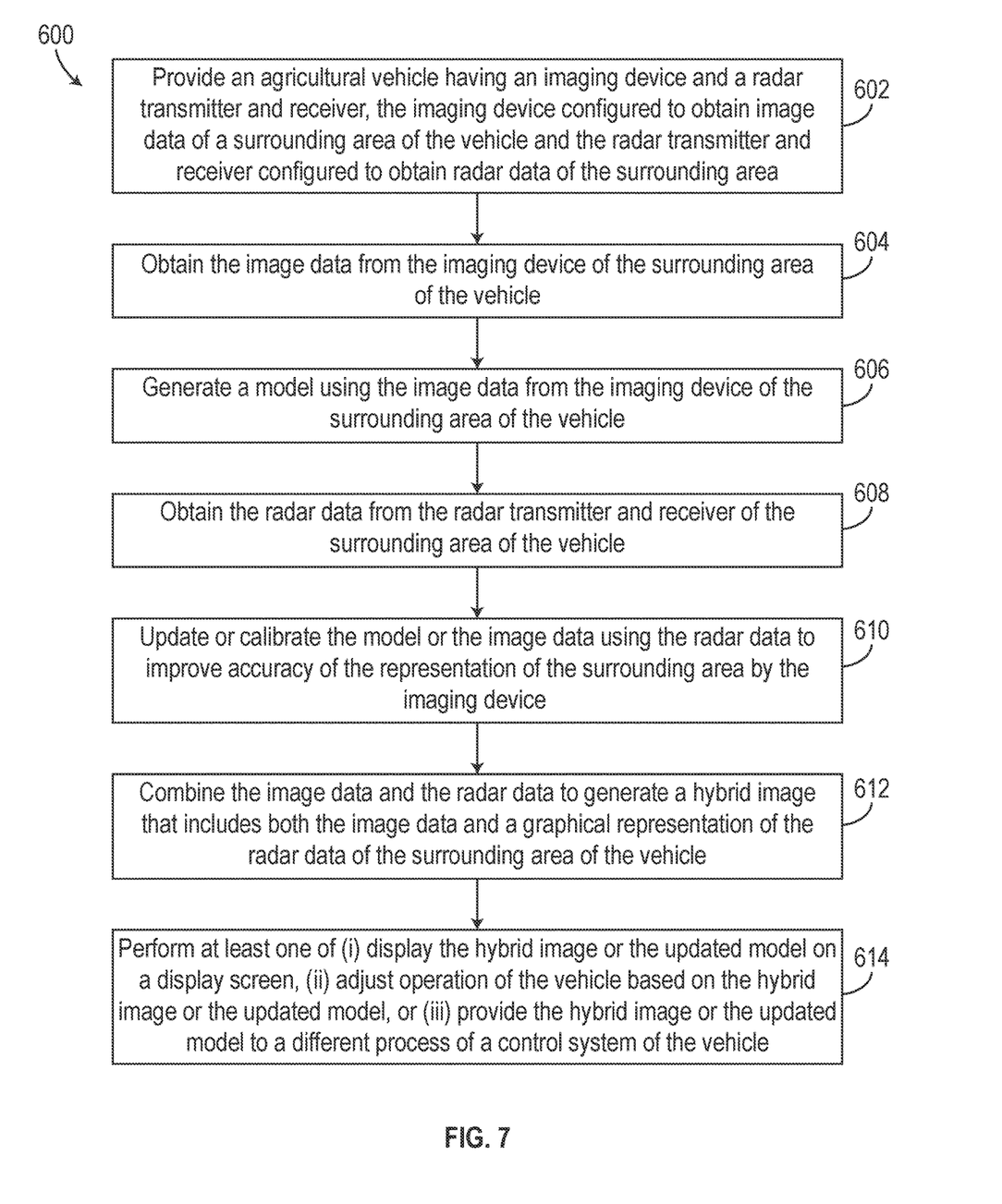
FIG. 7 is a flow diagram of a process for using image data and radar data in an imaging system for an agricultural machine, according to an exemplary embodiment.

Referring to FIG. 7, a flow diagram of a process 600 for using both imaging data and radar data to detect objects or obstacles proximate an agricultural vehicle (e.g., a tractor) includes steps 602-614, according to some embodiments. In some embodiments, process 600 is implemented, at least partially, by the imaging system 500. In some embodiments, process 600 advantageously combines radar data and image data (e.g., visible light image data) to provide hybrid or fused image data. Advantageously, using both the radar data and the image data provides both the intuitive and readily understandable benefits of using visible light image data, as well as the increased penetration abilities and improved visibility features of radar, in a single mode of display for the operator of the vehicle 10.

Process 600 includes providing an agricultural vehicle having an imaging device and a radar transmitter and receiver, the imaging device configured to obtain image data of a surrounding area of the vehicle and the radar transmitter and receiver configured to obtain radar data of the surrounding area (step 602), according to some embodiments. In some embodiments, the imaging device and the radar transmitter and receiver are positioned on the agricultural vehicle (e.g., the vehicle 10) such that the imaging device (e.g., the cameras 512) and the radar transmitter and receiver (e.g., the radar transceivers 514) are configured to capture data of the surrounding area of the vehicle (e.g., on top of the cab 30).

Process 600 includes obtaining the image data from the imaging device of the surrounding area of the vehicle (step 604) and generating a model using the image data from the imaging device of the surrounding area of the vehicle (step 606), according to some embodiments. In some embodiments, steps 604 and 606 are performed by the controller 502, or more particularly, by the model generator 526. In some embodiments, step 606 includes performing a process that results a 3D image or a 3D representation of multiple 2D images that are obtained from cameras at different positions and pointing in different directions. In some embodiments, step 606 is performed by the model generator 526 using any of the techniques described in greater detail above with reference to FIG. 6.

Process 600 includes obtaining the radar from the radar transmitter and receiver of the surrounding area of the vehicle (step 608) and updating or calibrating the model or the image data using the radar data to improve accuracy of the representation of the surrounding area by the imaging device (step 610), according to some embodiments. In some embodiments, step 608 is similar to step 604 but performed to obtain the radar data (e.g., via a CAN bus of the agricultural vehicle). In some embodiments, step 610 includes performing surface rendering of one or more objects that are detected in the radar data and modifying the model generated in step 606 to include the rendered surfaces of the objects detected in the radar data that may be obstructed by dust clouds and unviewable or difficult to detect in the image data. In some embodiments, step 610 is performed by model updater 528.

Process 600 includes combining the image data and the radar data to generate a hybrid image that includes both the image data and a graphical representation of the radar data of the surrounding area of the vehicle (step 612), according to some embodiments. In some embodiments, step 612 is performed instead of or in addition to steps 606 and 610. In some embodiments, step 612 is performed by the hybrid image generator 540. In some embodiments, step 612 includes superimposing a graphical representation of the radar data on the image data obtained from the imaging devices. For example, the radar data may be displayed with a highlighted color or with phantom lines. In some embodiments, a combination of the image model or the updated image model (e.g., a virtual camera) and hybrid imagery are used by the controller 502 in place of any of the image model, the updated image model, or the hybrid image.

Process 600 includes performing at least one of (i) displaying the hybrid image or the updated model on a display screen, (ii) adjusting operation of the vehicle based on the hybrid image or the updated model, or (iii) providing the hybrid image or the updated model to a different process of a control system of the vehicle (step 614), according to some embodiments. In some embodiments, the hybrid image or the updated model is presented on the display screen so that the operator of the agricultural vehicle can view the display and manually adjust operation or transportation of the agricultural vehicle appropriately (e.g., to avoid the object detected in the radar data). In some embodiments, adjusting operation of the vehicle includes automatically stopping, braking, decelerating, or changing course of the agricultural vehicle. In some embodiments, providing the hybrid image or the updated model to the different process of the control system of the vehicle includes providing the hybrid image or the updated model to an object detection system, an object identification system, a collision avoidance system, or a safety monitoring system of the agricultural vehicle.

As utilized herein with respect to numerical ranges, the terms "approximately," "about," "substantially," and similar terms generally mean+/−10% of the disclosed values, unless specified otherwise. As utilized herein with respect to structural features (e.g., to describe shape, size, orientation, direction, relative position, etc.), the terms "approximately," "about," "substantially," and similar terms are meant to cover minor variations in structure that may result from, for example, the manufacturing or assembly process and are intended to have a broad meaning in harmony with the common and accepted usage by those of ordinary skill in the art to which the subject matter of this disclosure pertains. Accordingly, these terms should be interpreted as indicating that insubstantial or inconsequential modifications or alterations of the subject matter described and claimed are considered to be within the scope of the disclosure as recited in the appended claims.

It should be noted that the term "exemplary" and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

The present disclosure contemplates methods, systems, and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

The term "client or "server" include all kinds of apparatus, devices, and machines for processing data, including by way of example a programmable processor, a computer, a system on a chip, or multiple ones, or combinations, of the foregoing. The apparatus may include special purpose logic circuitry, e.g., a field programmable gate array (FPGA) or an application specific integrated circuit (ASIC). The apparatus may also include, in addition to hardware, code that creates an execution environment for the computer program in question (e.g., code that constitutes processor firmware, a protocol stack, a database management system, an operating system, a cross-platform runtime environment, a virtual machine, or a combination of one or more of them). The apparatus and execution environment may realize various different computing model infrastructures, such as web services, distributed computing and grid computing infrastructures.

The systems and methods of the present disclosure may be completed by any computer program. A computer program (also known as a program, software, software application, script, or code) may be written in any form of programming language, including compiled or interpreted languages, declarative or procedural languages, and it may be deployed in any form, including as a stand-alone program or as a module, component, subroutine, object, or other unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform actions by operating on input data and generating output. The processes and logic flows may also be performed by, and apparatus may also be implemented as, special purpose logic circuitry (e.g., an FPGA or an ASIC).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data (e.g., magnetic, magneto-optical disks, or optical disks). However, a computer need not have such devices. Moreover, a computer may be embedded in another device (e.g., a vehicle, a Global Positioning System (GPS) receiver, etc.). Devices suitable for storing computer program instructions and data include all forms of non-volatile memory, media and memory devices, including by way of example semiconductor memory devices (e.g., EPROM, EEPROM, and flash memory devices; magnetic disks, e.g., internal hard disks or removable disks; magneto-optical disks; and CD ROM and DVD-ROM disks). The processor and the memory may be supplemented by, or incorporated in, special purpose logic circuitry.

To provide for interaction with a user, implementations of the subject matter described in this specification may be implemented on a computer having a display device (e.g., a CRT (cathode ray tube), LCD (liquid crystal display), OLED (organic light emitting diode), TFT (thin-film transistor), or other flexible configuration, or any other monitor for displaying information to the user. Other kinds of devices may be used to provide for interaction with a user as well; for example, feedback provided to the user may be any form of sensory feedback (e.g., visual feedback, auditory feedback, or tactile feedback).

Implementations of the subject matter described in this disclosure may be implemented in a computing system that includes a back-end component (e.g., as a data server), or that includes a middleware component (e.g., an application server), or that includes a front end component (e.g., a client computer) having a graphical user interface or a web browser through which a user may interact with an implementation of the subject matter described in this disclosure, or any combination of one or more such back end, middleware, or front end components. The components of the system may be interconnected by any form or medium of digital data communication (e.g., a communication network). Examples of communication networks include a LAN and a WAN, an inter-network (e.g., the Internet), and peer-to-peer networks (e.g., ad hoc peer-to-peer networks).

It is important to note that the construction and arrangement of the vehicle 10 and the systems and components thereof (e.g., the driveline 50, the braking system 100, the control system 200, etc.) as shown in the various exemplary embodiments is illustrative only. Additionally, any element disclosed in one embodiment may be incorporated or utilized with any other embodiment disclosed herein.

What is claimed is:

1. An agricultural vehicle comprising:
   a vision system comprising:
   a plurality of cameras configured to produce image data of an area proximate the agricultural vehicle;
   a radar transceiver configured to produce radar data of the area proximate the agricultural vehicle; and
   a controller configured to:
   obtain the image data and the radar data;

combine the image data and the radar data to produce combined image and radar data by overlaying, onto the image data, a visual representation of the radar data and objects indicated by the radar data that are obstructed, the combined image and radar data provided for viewing the area proximate the agricultural vehicle and accounting for dust clouds in the area proximate the agricultural vehicle; and present the combined image and radar data to an operator of the agricultural vehicle.

2. The agricultural vehicle of claim 1, wherein the plurality of cameras and the radar transceiver are positioned along a top portion of a cab of the agricultural vehicle.

3. The agricultural vehicle of claim 1, wherein combining the image data and the radar data comprises:

obtaining a plurality of sets of image data from the plurality of cameras;

performing a reconstruction technique using the plurality of sets of image data to generate a 3-dimensional model of the area proximate the agricultural vehicle; and updating or adjusting the 3-dimensional model of the area using the radar data to account for objects in the area proximate the agricultural vehicle that are obstructed by dust or particulate matter in the area proximate the agricultural vehicle.

4. The agricultural vehicle of claim 1, wherein combining the image data and the radar data comprises overlaying, onto the image data, the visual representation of the radar data while accounting for dust or particulate matter that obstructs the image data.

5. The agricultural vehicle of claim 1, wherein the visual representation is a wire model of an object detected by the radar transceiver.

6. The agricultural vehicle of claim 1, wherein the radar transceiver is a 3-dimensional radar transmitter and receiver that is configured to emit radio waves and receive returning radio waves to produce 3-dimensional radar data.

7. The agricultural vehicle of claim 1, wherein the controller is further configured to provide the combined image and radar data to at least one of:

an obstacle detection system configured to detect an obstacle in a path of the agricultural vehicle using the combined image and radar data;

an object identification system configured to identify a type of object in the combined image and radar data;

a collision avoidance system configured to use the combined image and radar data to alert the operator of the agricultural vehicle regarding an obstacle in the path of the agricultural vehicle and adjust a driveline operation of the agricultural vehicle to avoid the obstacle; and a safety monitoring system configured to use the combined image and radar data to aggregate safety data regarding different geographic locations of a field.

8. A vision system for an agricultural vehicle, the vision system comprising:

a plurality of cameras configured to produce image data of an area proximate the agricultural vehicle;

a radar transceiver configured to produce radar data of the area proximate the agricultural vehicle; and processing circuitry, configured to:

obtain the image data and the radar data;

combine the image data and the radar data to produce combined image and radar data by overlaying, onto the image data, a visual representation of the radar data and objects indicated by the radar data that are obstructed, the combined image and radar data provided for viewing the area proximate the agricultural vehicle and accounting for dust clouds in the area proximate the agricultural vehicle; and present the combined image and radar data to an operator of the agricultural vehicle.

9. The vision system of claim 8, wherein combining the image data and the radar data comprises:

obtaining a plurality of sets of image data from the plurality of cameras;

performing a reconstruction technique using the plurality of sets of image data to generate a 3-dimensional model of the area proximate the agricultural vehicle; and updating or adjusting the 3-dimensional model of the area using the radar data to account for objects in the area proximate the agricultural vehicle that are obstructed by dust or particulate matter in the area proximate the agricultural vehicle.

10. The vision system of claim 8, wherein combining the image data and the radar data comprises overlaying, onto the image data, the visual representation of the radar data while accounting for dust or particulate matter that obstructs the image data.

11. The vision system of claim 10, wherein the visual representation is a wire model of an object detected by the radar transceiver.

12. The vision system of claim 8, wherein the radar transceiver is a 3-dimensional radar transmitter and receiver that is configured to emit radio waves and receive returning radio waves to produce 3-dimensional radar data.

13. The vision system of claim 8, wherein the processing circuitry is further configured to provide the combined image and radar data to at least one of:

an obstacle detection system configured to detect an obstacle in a path of the agricultural vehicle using the combined image and radar data;

an object identification system configured to identify a type of object in the combined image and radar data;

a collision avoidance system configured to use the combined image and radar data to alert the operator of the agricultural vehicle regarding an obstacle in the path of the agricultural vehicle and adjust a driveline operation of the agricultural vehicle to avoid the obstacle; and a safety monitoring system configured to use the combined image and radar data to aggregate safety data regarding different geographic locations of a field.

14. A method for detecting objects in an environment of an agricultural vehicle, the method comprising:

obtaining image data from a plurality of cameras configured to capture image data of visible light, and obtaining radar data from a radar transmitter and receiver;

combining the image data with the radar data to produce combined image and radar data by overlaying, onto the image data, a visual representation of the radar data and objects indicated by the radar data that are obstructed, the combined image and radar data provided for viewing an area proximate the agricultural vehicle and accounting for dust clouds in the area proximate the agricultural vehicle; and operating a display screen to display the combined image and radar data to an operator of the agricultural vehicle so that the operator can view a visual representation of an object obstructed by the dust clouds or particulate matter.

15. The method of claim 14, wherein combining the image data and the radar data comprises:

obtaining a plurality of sets of image data from the plurality of cameras;

performing a reconstruction technique using the plurality of sets of image data to generate a 3-dimensional model of the area proximate the agricultural vehicle; and updating or adjusting the 3-dimensional model of the area using the radar data to account for the object in the area proximate the agricultural vehicle that are obstructed by the dust clouds or particulate matter in the area proximate the agricultural vehicle.

16. The method of claim 14, wherein combining the image data and the radar data comprises overlaying, onto the image data, the visual representation of the radar data while accounting for dust or particulate matter that obstructs the image data.

17. The method of claim 14, wherein the visual representation is a wire model of the object detected by the radar receiver.

18. The method of claim 14, wherein the radar transmitter and receiver is a 3-dimensional radar transmitter and receiver that is configured to emit radio waves and receive returning radio waves to produce 3-dimensional radar data.

19. The method of claim 14, wherein the method further comprises providing the combined image and radar data to at least one of:
- an obstacle detection system configured to detect an obstacle in a path of the agricultural vehicle using the combined image and radar data;
- an object identification system configured to identify a type of object in the combined image and radar data;
- a collision avoidance system configured to use the combined image and radar data to alert the operator of the agricultural vehicle regarding an obstacle in the path of the agricultural vehicle and adjust a driveline operation of the agricultural vehicle to avoid the obstacle; and
- a safety monitoring system configured to use the combined image and radar data to aggregate safety data regarding different geographic locations of a field.

20. The method of claim 14, further comprising adjusting a driveline operation of the agricultural vehicle to adjust speed or steering of the agricultural vehicle responsive to the combined image and radar data.

* * * * *